O. C. McCORMICK.
DRIER.
APPLICATION FILED SEPT. 9, 1916.

1,268,983.

Patented June 11, 1918.
3 SHEETS—SHEET 1.

INVENTOR
Oscar C. McCormick,
By C. E. Humphry Attorney

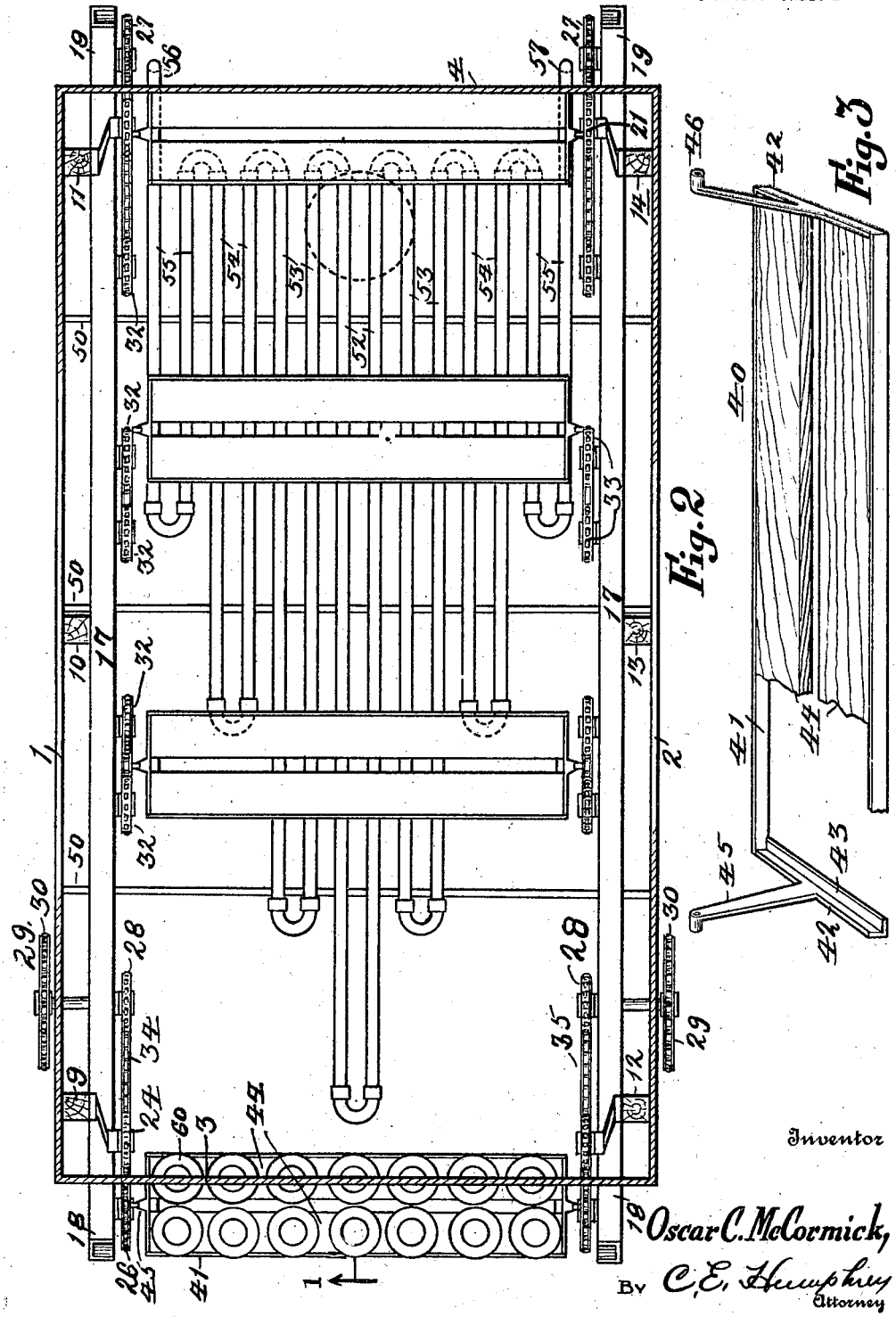

O. C. McCORMICK.
DRIER.
APPLICATION FILED SEPT. 9, 1916.
1,268,983.
Patented June 11, 1918.
3 SHEETS—SHEET 3.
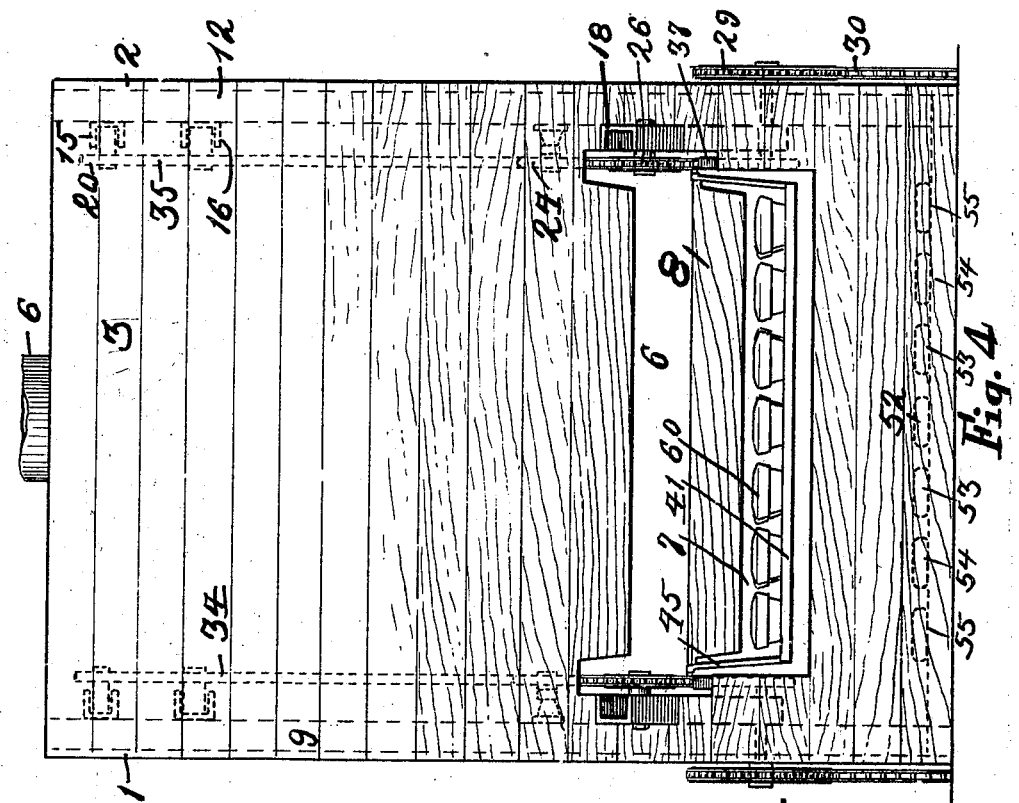
INVENTOR—
Oscar C. McCormick,
BY C. E. Humphrey
Attorney

UNITED STATES PATENT OFFICE.

OSCAR C. McCORMICK, OF CLEVELAND, OHIO, ASSIGNOR OF ONE-FOURTH TO JAMES E. MOYER, OF AKRON, OHIO, ONE-FOURTH TO SAMUEL K. HINE, OF GIRARD, OHIO, ONE-EIGHTH TO JOHN W. WRIGHT, OF YOUNGSTOWN, OHIO, AND ONE-EIGHTH TO WILLIAM P. CANFIELD, OF PITTSBURGH, PENNSYLVANIA.

DRIER.

1,268,983.      Specification of Letters Patent.      Patented June 11, 1918.

Application filed September 9, 1916. Serial No. 119,243.

*To all whom it may concern:*

Be it known that I, OSCAR C. MCCORMICK, a citizen of the United States, residing at Cleveland, in the county of Cuyahoga and State of Ohio, have invented new and useful Improvements in Driers, of which the following is a specification.

This invention relates to driers especially adapted for use in drying green or newly fashioned earthen-ware articles such for instance as cups, saucers, plates and the like previous to the burning thereof.

The object of the invention is to provide an improved drier of the class designated capable of expelling moisture from articles formed of plastic clay while in a moist condition in order to prepare them for burning.

More particularly the invention contemplates the provision of a drying chamber or casing having end walls each provided with two openings and a conveyer for transporting the ware from one end of the casing or chamber to the other and so supported that the conveyer passes out of the entrance opening in one end wall and returns to the interior of the chamber through the other opening to permit of the placement of the molds containing the green ware on the conveyer and which conveys the ware through the drier by a sinuous or meandering path and out through the exit opening at the opposite end of the chamber or casing where the dried ware is removed from the molds and the molds replaced on the conveyer for return to the opposite end of the chamber or casing.

A further object of the invention is to provide heating mechanism for heating the exit end of the chamber or casing to a higher degree than obtains at the entrance so that the ware is gradually heated and dried in its passage through the device. By this provision the empty molds at the rear or exit end of the casing when reëntering the latter and containing moisture absorbed from the articles are subject to the most intense heat and pass through the hottest portion of the drier in their passage to the entrance so as to expel the moisture contained there.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a vertical, sectional view taken approximately on line 1 of Fig. 2.

Fig. 2 is a horizontal, sectional view taken approximately on line 2 of Fig. 1.

Fig. 3 is a perspective view of one of the racks on the conveyer for supporting the ware, and Fig. 4 is an end elevation of the device and as both ends are approximately identical the view is applicable to either end of the same.

Figure 1:
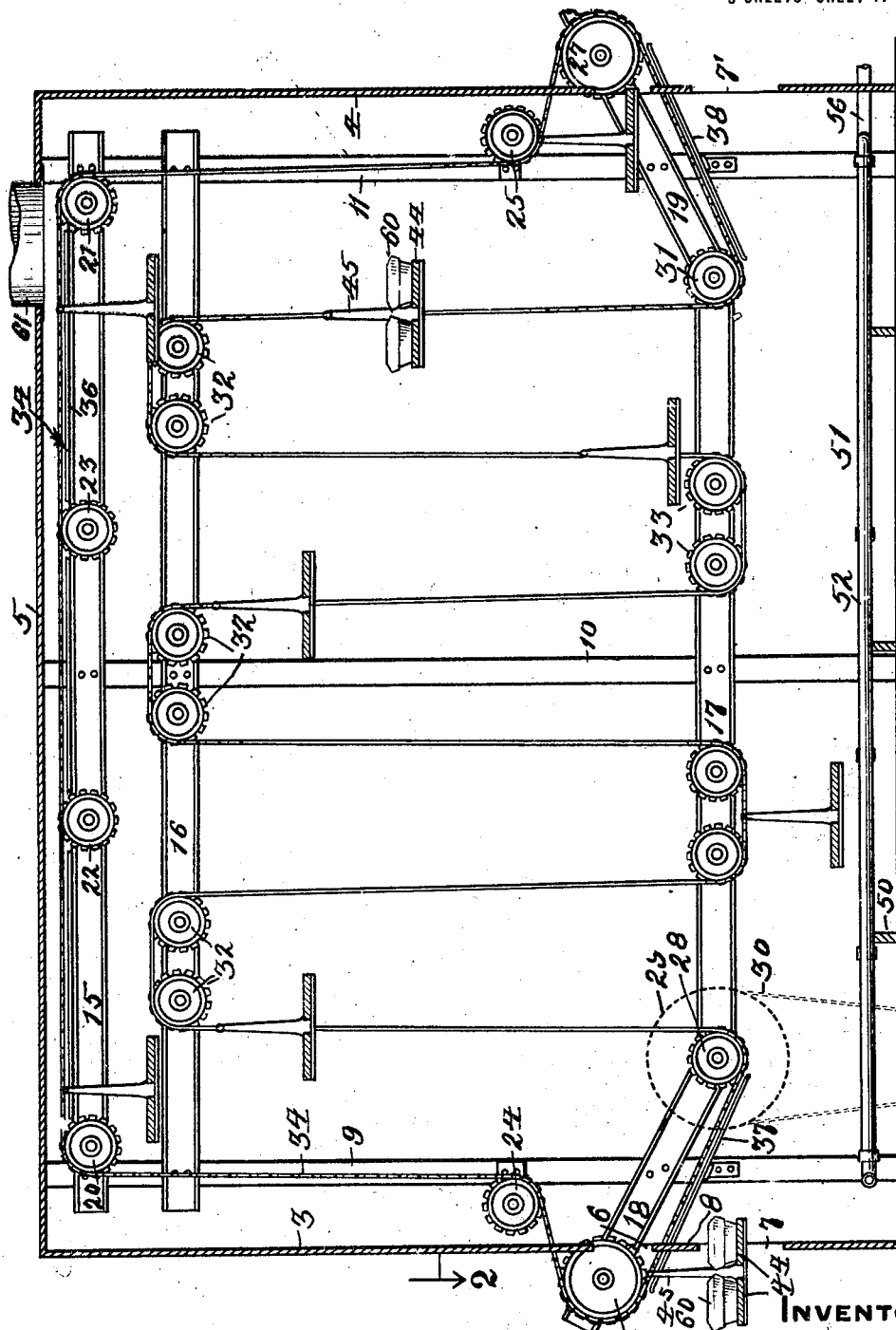

Referring more particularly to the drawings the device embodies a casing or chamber provided with lateral walls 1 and 2, end walls 3 and 4 and an upper wall 5. The upper wall 5 is provided with an off-take flue 6. Each end wall is provided with a transverse opening 6 below which is a second opening 7 in the wall 3 and an opening 7' in the wall 4 and between the openings in each end wall and serving to separate them one from the other is a partition 8. The opening 6 in the wall 3 forms an exit opening and the opening 7 in the same wall forms an entrance opening. The opening 6 in the wall 4 forms an entrance opening and the opening 7 in the same wall forms an exit opening. Extending upwardly along the wall 1 are a plurality of posts 9, 10 and 11 and extending along the wall 2 are posts 12, 13 and 14, the arrangement being such that the post 9 is oppositely disposed to the post 12; the post 10 to the post 13 and the post 11 to the post 14. Secured to the various posts 9 to 14 inclusive are supporting instrumentalities consisting of channel beams and as the arrangement on both sides of the device is similar it is believed a description of the supporting mechanism on the posts 9, 10 and 11 will be sufficient for the understanding of both.

Extending longitudinally and horizontally of the device is a channel beam secured to the posts 9—11. Below this beam 15 and parallel therewith is a second beam 16 also secured to the posts 9—11 inclusive. Near the lower portion of the device is a channel beam 17 the median portion of which is parallel with the beams 15 and 16 and which is secured to the post 10. The beam 17 is provided with upwardly inclined ends 18 and 19 connected by suitable means to the posts 9 and 11 respectively and the outer ends of the beams 18 and 19 project through the openings 6 in the ends 3 and 4. Mounted on suitable bearings on the opposing beams 15 and at the left end of the device in Figs. 1 and 2 are sprocket wheels 20. These sprocket wheels are in transverse alinement and are freely rotatable. Mounted at the opposite ends of the two beams 15 on suitable bearings are sprocket wheels 21. Mounted intermediate the sprocket wheels 20 and 21 on the beams 15 are sprocket wheels 22 and 23. Mounted on suitable brackets on the posts 9 and 12 are sprocket wheels 24 and mounted on the posts 11 and 14 and supported by suitable brackets are sprocket wheels 25. Mounted on the two upwardly bent ends 18 of the channel beams 17 are rotatable sprocket wheels 26 and on the opposite upwardly bent ends 19 of the same beam 17 are sprocket wheels 27. Rotatably mounted on suitable bearings on the beam 17 at the junction between the bent portion 18 and the main portion of the beams are sprocket wheels 28, the shafts of which project outside of the walls 1 and 2 and are there provided with sprocket wheels 29 to which are connected sprocket chains 30 connecting with any source of suitable supply for rotating the sprocket wheels 28. Mounted in suitable bearings on the beams 17 at their junction with the upwardly inclined portions 19 are sprocket wheels 31. Mounted in suitable bearings on the two opposing channel beams 16 and separated from each other are a plurality of pairs of spaced sprocket wheels 32 the pairs being separated from each other and interposed between the pairs of sprocket wheels 32 and rotatably mounted in suitable bearings on the bar 17 are pairs of sprocket wheels 33 the members of each pair being spaced from each other. Extending around the sprocket wheels 20, 21, 22, 23, 24, 25, 26, 27, 28, 31 and 32 on one side of the device is a sprocket chain 34 and a similar chain 35 extends around the opposing sprocket wheels on the opposite side. Positioned between the sprocket wheels 20 and 22, 22 and 23, and 23 and 21 on both sides of the device are supporting plates 36 to keep the sprocket chains 34 and 35 from sagging between their supporting sprocket wheels. Secured to both posts 9 and 12 are inclined supporting plates 37 for supporting the sprocket chains 34 and 35 between the sprocket wheels 26 and 28 and secured to the posts 11 and 14 are supporting plates 38 for supporting the sprocket chains between the sprocket wheels 31 and 27. Secured between the sprocket chains 34 and 35 are a plurality of ware carrying racks denominated by the reference numerals 40 and shown best in Fig. 3, and each comprising a skeleton frame 41 preferably rectangular in cross section and each end member 42 thereof provided with an inwardly projecting flange 43 for supporting a pair of separated strips 44 constituting the supporting media for the ware. Extending upwardly from the members 42 and preferably inclined outwardly and away from each other are arms 45 terminating in socket heads 46 to receive pins carried by the chains 34 and 35 for supporting these racks.

Extending transversely of the lower portion of the chamber of the casing are a plurality of supports. Extending longitudinally of the lower portion of the device and mounted on the supports 50 is a pipe coil 51 so constructed that the central portion 52 of the coil projects toward the left or entrance end of the device farther than do the coils 53 on the opposite sides thereof and the coils 54 on the opposite sides of the coils 53 are shorter than the coils 53 and outside of these coils 54 are coils 55 which are shorter than the coils 54. One of the ends 56 of the coils 55 projects outwardly through the end wall 4 and is connected with a source of supply for heating fluid such for instance as steam and one of the other coils 57 of a coil 55 on the opposite side of the device extends through the wall 4 to constitute an exhaust opening.

The operation of the device is as follows: The device is heated by steam or other fluid passed through the pipe coil in the base of the device and the end of the drier which is nearest to the wall 4 will be considerably hotter than the opposite end due to the presence of a greater radiating surface of the pipe coil. The various racks 40 are loaded with molds denominated by the reference numeral 60 while outside of the end wall 3, and of course these molds contain green and freshly formed articles of plastic material, such as cups, saucers, plates and the like. The racks reënter the drying chamber through the entrance opening 7 in the wall 3 and the chains are supported by the supports or plates 37 and the chains and racks are carried around the sprocket wheel 28 and alternately around the parallel sprocket wheels 32 and 33 until the racks pass outwardly through the opening 7 in the wall 4 at which point the ware is substantially dried and removed from the molds and the empty molds, probably containing a considerable percentage of absorbed moisture are replaced on the racks and the racks and molds reenter through the opening 6 in the wall 4 and pass upwardly through the hottest portions of the conveyer on the chains 34 and 35 along the upper and hotter portions of the conveyer and around the sprocket wheels 20 and downwardly past the idle-sprocket-wheels 24 and out through the opening 6 in the wall 3 where the molds are refilled with green plastic ware.

I claim:

A drier comprising in combination a heating chamber having an upper wall and side and end walls, said end walls each provided with a pair of openings the members of which are spaced apart, a series of vertical posts arranged in spaced relation near each of said side walls, a horizontal beam secured to each series of posts near the upper wall, sprocket wheels on said beams, a second pair of beams secured to each series of posts and positioned below said first beams, sprocket wheels arranged in pairs mounted on said second beam, a third pair of beams each of which is secured to said posts near the lower ends thereof the ends of said third beams projecting out through the openings in the end walls of said device, a series of pairs of sprocket wheels on said third beam, each pair being disposed in alternate vertical relation with respect to the pairs of sprocket wheels on the second beams, sprocket wheels on the projecting portions of said third beams outside of said end walls, a sprocket chain on each series of sprocket wheels, and arranged to pass around said pairs of sprocket wheels and be held by them in spaced relation, said sprocket chains also adapted to run around the sprocket wheels on the projecting ends of said third beams outside of said chamber, ware racks mounted on said sprocket chains, means to move said chains simultaneously to cause the racks to pass out through the end openings for the loading and unloading operations, and means to heat said chamber.

In testimony whereof I have hereunto set my hand.

OSCAR C. McCORMICK.